United States Patent
Strassenburg-Kleciak

(10) Patent No.: US 9,574,897 B2
(45) Date of Patent: Feb. 21, 2017

(54) METHOD OF GENERATING A DATABASE FOR A NAVIGATION DEVICE, METHOD OF OUTPUTTING A THREE-DIMENSIONAL MAP, AND NAVIGATION DEVICE

(75) Inventor: Marek Strassenburg-Kleciak, Garching (DE)

(73) Assignee: HARMAN BECKER AUTOMOTIVE SYSTEMS GMBH, Karlsbad (DE)

(*) Notice: Subject to any disclaimer, the term of this patent is extended or adjusted under 35 U.S.C. 154(b) by 199 days.

(21) Appl. No.: 14/122,843

(22) PCT Filed: May 31, 2012

(86) PCT No.: PCT/EP2012/060232
§ 371 (c)(1),
(2), (4) Date: Apr. 8, 2014

(87) PCT Pub. No.: WO2012/164010
PCT Pub. Date: Dec. 6, 2012

(65) Prior Publication Data
US 2014/0244161 A1    Aug. 28, 2014

(30) Foreign Application Priority Data

Jun. 1, 2011 (EP) ..................... 11168539

(51) Int. Cl.
*G01C 21/00* (2006.01)
*G08G 1/123* (2006.01)
(Continued)

(52) U.S. Cl.
CPC .......... *G01C 21/3635* (2013.01); *G01C 21/32* (2013.01); *G06F 17/30292* (2013.01); *G06T 17/05* (2013.01)

(58) Field of Classification Search
CPC ................. G01C 21/3635; G01C 21/32; G06F 17/30292; G06T 17/05
(Continued)

(56) References Cited

U.S. PATENT DOCUMENTS 6,169,516 B1    1/2001   Watanabe et al.
6,735,557 B1*   5/2004   Castellar ................. G06T 15/00
                                                          701/436
(Continued)

FOREIGN PATENT DOCUMENTS

EP    1107189 A2    6/2001
EP    1584897 A2   10/2005
(Continued)

OTHER PUBLICATIONS

International Search Report, PCT/EP2012/060232, May 31, 2012.

*Primary Examiner* — Aaron L Troost
*Assistant Examiner* — Paula L Schneider
(74) *Attorney, Agent, or Firm* — Artegis Law Group, LLP

(57) ABSTRACT

In a method of generating a database for use in outputting three-dimensional maps, a projection of a two-dimensional road vector onto a three-dimensional surface defined by digital terrain model data is determined. At least one three-dimensional road vector (94, 95, 98, 99) is determined based on the established projection and is stored in the database. The database is generated before it is deployed to a navigation device for use in outputting three-dimensional maps. A method of outputting three-dimensional maps and a navigation device may use the thus generated database.

15 Claims, 9 Drawing Sheets

(51) Int. Cl.
  *G01C 21/34* (2006.01)
  *G01C 21/36* (2006.01)
  *G06T 17/05* (2011.01)
  *G01C 21/32* (2006.01)
  *G06F 17/30* (2006.01)

(58) Field of Classification Search
  USPC .......................................................... 701/436
  See application file for complete search history.

(56) References Cited

U.S. PATENT DOCUMENTS

| | | | |
|---|---|---|---|
| 6,972,757 B2* | 12/2005 | Arikawa | G06T 3/0087 |
| | | | 345/419 |
| 2005/0137794 A1* | 6/2005 | Cui | G01C 21/3638 |
| | | | 701/431 |
| 2007/0225902 A1* | 9/2007 | Gretton | G01C 21/26 |
| | | | 701/533 |
| 2009/0030606 A1* | 1/2009 | Pfeifle | G01C 21/32 |
| | | | 701/533 |
| 2011/0160995 A1* | 6/2011 | Geilich | G01C 21/32 |
| | | | 701/532 |

FOREIGN PATENT DOCUMENTS

| | | |
|---|---|---|
| EP | 1672591 A2 | 6/2006 |
| EP | 1750238 A1 | 2/2007 |
| EP | 1912176 A1 | 4/2008 |

\* cited by examiner

METHOD OF GENERATING A DATABASE FOR A NAVIGATION DEVICE, METHOD OF OUTPUTTING A THREE-DIMENSIONAL MAP, AND NAVIGATION DEVICE

TECHNICAL FIELD

Embodiments of the invention relate to methods and devices associated with the outputting of three-dimensional maps by a navigation device. Embodiments of the invention relate in particular to a method of generating a database for a navigation device, to a method of displaying a three-dimensional map, and to a navigation device which allow three-dimensional maps, i.e. perspective views, to be output.

BACKGROUND

Optical output devices are widely used in navigation devices. Such output devices may be used for outputting electronic maps. Since electronic maps may be displayed on screens of small and/or portable devices, they have the advantage of being versatile and compact.

Three-dimensional (3D) maps, i.e. perspective representations, may be of particular value to the user owing to their high recognition quality. The recognition of an environmental region, such as a street intersection, may be facilitated when a three-dimensional map is output, as compared to a conventional two-dimensional representation.

Various approaches for configuring a navigation device such that 3D maps can be displayed are conceivable. Graphical images representing a perspective view of road intersection areas may be pre-computed and stored in the navigation device. Such an approach would be efficient in terms of computation time when the 3D map is to be displayed, but suffers from reduced flexibility. If a limited set of graphical images representing a finite set of intersection types is stored, integration of such graphical images with a terrain model may be challenging.

In another approach, digital terrain model (DTM) data may be stored in the navigation device. The navigation device may compute a projection of the two-dimensional road vectors of a conventional digital map onto the surface defined by the DTM data at run time. Such an approach provides higher flexibility, but may be costly in terms of computation time and/or computation resources. EP 1 107 189 A2 describes a map displaying system and method in which a navigation system stores a 2D map and landform data, which need to processed by the navigation system to prepare 3D map data.

SUMMARY

Accordingly, there is a need for navigation devices and methods which provide flexibility in displaying 3D maps. There is also a need for such devices and methods which allow perspective views of road segments to be generated while requiring only moderate computational resources at run-time.

According to embodiments, methods and a device as recited in the independent claims are provided. The dependent claims define embodiments.

According to an aspect, a method of generating a database for a navigation device is provided. In the method, a plurality of two-dimensional road vectors are retrieved from a 2D map database, with each one of the two-dimensional road vectors defining a road segment of a road network. Digital terrain model data defining a three-dimensional surface are retrieved. For each two-dimensional road vector of the plurality of retrieved two-dimensional road vectors, a projection of the two-dimensional road vector onto the three-dimensional surface along a pre-defined projection direction is established. For each two-dimensional road vector, at least one three-dimensional road vector is determined based on the established projection, the at least one three-dimensional road vector including height information for points located on the at least one three-dimensional road vector. The at least one three-dimensional road vector is stored in the database. The steps for generating the database are performed before the database is deployed to a navigation device.

Using the method, a database which includes three-dimensional road vectors, i.e. road vectors which include height information, is generated before the database is deployed to the navigation device. Conventional 2D map data which do not include height information for the points located on road segments are pre-processed to generate a database which includes such height information for road segments. This allows computationally costly steps, such as projecting two-dimensional road vectors onto a three-dimensional surface, to be performed in a pre-processing phase in which the database is generated. It is then no longer required to perform such projection steps at run time, when the navigation device outputs a 3D map. The requirements imposed on computational resources and/or computation time for generating the 3D map in the navigation device can be reduced. The projection of two-dimensional road vectors of a 2D map onto a three-dimensional surface does not need to be computed onboard the vehicle.

The method of generating the database may be performed by an electronic device which is separate from a vehicle. The database may be deployed to navigation devices of vehicles, e.g. by transferring the database to a storage device of the navigation device via wired or wireless data communication channels.

According to general practice, the projection direction corresponds to the direction parallel to the gravity vector. This axis will also be referred to as z-axis. The height information may be a coordinate along the projection direction and will also be referred to as z-coordinate.

The three-dimensional road vector(s) may have various data formats. For illustration, a coordinate 3-tuple representing the (x, y, z)-coordinates of the starting point and another coordinate 3-tuple representing the (x, y, z)-coordinates of the endpoint of the three-dimensional road vector may be determined. Other representations are possible. For illustration, a coordinate 3-tuple representing the (x, y, z)-coordinate triple of one of the starting point or endpoint in combination with a pair of angles defining the orientation of the three-dimensional road vector and a length of the three-dimensional road vector may be determined and stored in the database.

The data defining the three-dimensional road vector(s) may be such that the data provides information on a height difference between the starting point and the endpoint of the road segment.

In order to determine the at least one three-dimensional road vector, for plural intermediate points located on the established projection a distance of the intermediate point from a straight line passing through an initial point of the projection and an endpoint of the projection may respectively be determined. The distance is respectively determined in the conventional manner as length of a line oriented perpendicularly to the straight line which passes from the respective intermediate point to the straight line.

Thereby, the unevenness of the terrain along the road segment may be quantified. The number of three-dimensional road vectors required to describe the road segment with a given accuracy may be selected accordingly. The number of three-dimensional road vectors, and thus the storage space required for the database, may be kept moderate by using the distance of the intermediate points from the straight line to selectively generate additional three-dimensional road vectors.

A threshold comparison may respectively be performed for such a distance, and the at least one three-dimensional road vector may be determined based on the threshold comparison. Thereby, the number of three-dimensional road vectors required to describe the road segment may be adjusted based on the threshold comparison. If the determining of three-dimensional road vectors is performed several times for several different levels of detail, the threshold may be selected based on the level of detail.

Intermediate points of the projection may be discarded when defining the three-dimensional road vector(s), based on a distance of the respective intermediate points from a line which is defined by two points which are each located on the three-dimensional surface. This allows storage space requirements to be reduced. The criterion for discarding intermediate points may thus be based on a distance of points from a line which extends along the three-dimensional surface.

More than one three-dimensional road vector may be selectively determined for a two-dimensional road vector if, for an intermediate point, the distance is greater than the threshold. Thereby, the number of three-dimensional road vectors generated for one two-dimensional road vector may be selectively increased when required to accommodate unevenness of the terrain.

The three-dimensional surface defined by the digital terrain model data may include a plurality of facets. The plurality of facets may be triangular facets of an irregular triangulated network (INT). The plural intermediate points may include points of the projection located on boundaries between facets. Using such intermediate points for performing the threshold comparison, the unevenness of the terrain may be efficiently accounted for.

Modified digital terrain model data may be generated based on the digital terrain model data and based on the determined at least one three-dimensional road vector. The modified digital terrain model data may be stored in the database before the database is deployed to the navigation device. By generating the modified terrain model data, a seamless transition between road segments and surrounding terrain may be ensured when a 3D map is output by the navigation device. Generating the modified digital terrain model data may include a re-triangularization performed based on the three-dimensional road vectors and, optionally, other quantities such as road widths.

Information on a road width may respectively be retrieved for the plurality of two-dimensional road vectors. The at least one three-dimensional road vector and the modified digital terrain model data may be determined based on the information on a road width. By generating the at least one three-dimensional road vector based on the road width artefacts that could occur at transition nodes between one road segment and another road segment may be mitigated or eliminated.

Information on the road width may respectively be retrieved by determining a road class of the respective road segment. The road class may, for illustration, be a function road class. Road classifications are generally available for the 2D map database from which the two-dimensional road vectors are retrieved and may be utilized in determining the at least one three-dimensional road vector and/or for defining new triangular facets for the modified digital terrain model data.

In determining the three-dimensional road vectors and the modified digital terrain model data, the following assumptions may be used as constraints: The road width can be determined from the road class stored for the respective road segment in the 2D map database. A line extending on the road surface in a direction normal to the three-dimensional vector for the road segment is normal to the projection direction; i.e., such a line extends horizontally. Areas at which two or more road segments meet are horizontal. I.e., such areas may be defined as planar polygons oriented perpendicularly to the projection direction.

Generating the modified digital terrain model data may include determining, for each one of the determined three-dimensional road vectors, a triangular facet in which the respective three-dimensional road vector extends and which has an edge normal to both the three-dimensional road vector and the projection direction. Thereby, the realistic constraint may be enforced that a vector extending across the surface of a road segment, which is normal to the longitudinal direction of the road segment (i.e., to the three-dimensional road vector), is oriented horizontally. I.e., such a vector extending across the surface of a road segment may thus be enforced to be parallel to the x-y-plane.

Generating the modified digital terrain model data may include determining, for plural three-dimensional road vectors of the determined three-dimensional road vectors, respectively a triangular facet in which the respective three-dimensional road vector extends and which has a horizontal edge normal to the three-dimensional road vector.

Generating the modified digital terrain model data may include defining a horizontal transition area at a node of the road network at which a first two-dimensional road vector and a second two-dimension road vector abut on each other. A polygon defining a boundary of the horizontal transition area may be defined based on a projection of the first two-dimensional road vector and the second two-dimension road vector onto the three-dimensional surface. The DTM data may be re-defined such that a height coordinate of the polygon is different from a height coordinate of the projection of the node onto the three-dimensional surface as defined by the original, i.e. not re-defined DTM data.

In order to generate the modified digital terrain model data, nodes of the road network to which respectively at least a first two-dimensional road vector and a second two-dimensional road vector are connected may be identified. For each one of the identified nodes, a planar polygon oriented normal to the projection direction may be determined such that a first three-dimensional road vector determined for the first two-dimensional road vector and a second three-dimensional road vector determined for the second two-dimensional road vector are arranged within the polygon. Thereby, a transition area which is parallel to the x-y-plane may be implemented at the nodes at which at least two road segments meet. Artefacts that could otherwise be present at such nodes may be mitigated or eliminated.

A corner of the polygon may be determined by computing three spatial coordinates of an intersection point of a first road boundary determined for the first two-dimensional road vector and of a second road boundary determined for the second two-dimensional road vector. Such an intersection point may be readily determined as intersection point of lines which extend parallel to the direction vectors of the respective three-dimensional road vector and are offset therefrom in a direction parallel to the x-y-plane. The lines representing road boundaries may be parameterized as $$\vec{p}_i(\lambda_i) = \vec{p}_{A,i} + \lambda_i \cdot \vec{e}_i \pm d_i \cdot \vec{e}_i \times \vec{e}_p, \quad (1)$$

where i denotes a label for a three-dimensional road vector which is connected to the node, $\vec{p}_{A,i}$ is a coordinate three-tuple of the initial point of the three-dimensional road vector, $\vec{e}_i$ is a unit vector pointing along the three-dimensional road vector, $\vec{e}_p$ is a unit vector pointing along the projection direction, $\lambda_i \in [0, l_i]$ is a parameter with $l_i$ being the length of the three-dimensional road vector, and $d_i$ is half the road width of the road segment associated with the road vector. By intersecting two lines having the form given by Equation (1), which correspond to road boundaries of different road segments, the height (z-coordinate) of the planar polygon may be determined.

A subset of edges of the polygon may respectively be oriented such that each edge of the subset is normal to the projection direction and respectively one of the two-dimensional road vectors connected to the respective node. Thereby, a smooth transition from the road segment to the transition or junction area defined by the polygon may be ensured.

The nodes for which a planar polygon normal to the projection direction is determined may include road junctions to which more than two two-dimensional road vectors are connected. By introducing such horizontal planar areas at junctions, artefacts that could occur in perspective views may be mitigated or eliminated.

The database may be a relational database. Coordinates of the initial point and/or endpoint of a three-dimensional road vector may be stored as attributes of a road segment in the relational database.

The database may be a map database in accordance with the Navigation Data Standard (NDS).

According to another aspect, a database generated using a method of generating a database according to any one aspect or embodiment is provided.

According to another aspect, a method of outputting a three-dimensional map via an optical output device of a navigation device is provided. A database storing digital terrain model data and three-dimensional road vectors is accessed. The three-dimensional road vectors represent road segments of a road network and include height information. At least one three-dimensional road vector may be retrieved. The optical output device is controlled so as to generate a perspective view of at least one road segment represented by the at least one three-dimensional road vector based on the retrieved at least one three-dimensional road vector and independently of the digital terrain model data.

In this method, a database storing road vectors as three-dimensional vectors is used in the navigation device. This allows perspective views of road segments to be generated directly based on the three-dimensional road vectors. It is not required to compute a projection of two-dimensional road vectors onto a surface defined by a digital terrain model at run time.

The database used in this method may be the database generated using the method of generating a database according to any one aspect or embodiment. The digital terrain model data of the database used in the method of displaying the three-dimensional map may correspond to the "modified digital terrain model data" as mentioned in the context of the method of generating the database. I.e., consistency between the digital terrain model data and the three-dimensional road vectors may be ensured.

The method may include generating a perspective view of terrain surrounding the road segments. The perspective view of the terrain may be generated based on digital terrain model data retrieved from the database.

If a two-dimensional map is to be displayed, the height information of the three-dimensional road vectors may be discarded. I.e., the two-dimensional map may be generated by using the x- and y-coordinates of initial points and endpoints of three-dimensional road vectors, but not the z-coordinates.

According to another aspect, a navigation device is provided. The navigation device comprises an optical output device, a database and a processing device. The database stores digital terrain model data and three-dimensional road vectors. The three-dimensional road vectors respectively represent road segments of a road network and include height information. The processing device is coupled to the optical output device and to the database. The processing device is configured to retrieve at least one three-dimensional road vector from the database and to control the optical output device to generate a perspective view of at least one road segment represented by the at least one three-dimensional road vector based on the retrieved at least one three-dimensional road vector and independently of the digital terrain model data.

This navigation device has a database storing road vectors as three-dimensional vectors. This allows perspective views of road segments to be generated directly based on the three-dimensional road vectors. It is not required to compute a projection of two-dimensional road vectors onto a surface defined by a digital terrain model at run time.

The database used in this method may be the database generated using the method of generating a database according to any one aspect or embodiment. The digital terrain model data of the database used in the method of displaying the three-dimensional map may correspond to the "modified digital terrain model data" as mentioned in the context of the method of generating the database. I.e., consistency between the digital terrain model data and the three-dimensional road vectors may be ensured.

The processing device may be configured to generate a perspective view of terrain surrounding the road segments based on digital terrain model data retrieved from the database.

The navigation device may be a vehicle navigation device. The vehicle navigation device may be removably or fixedly installed in a vehicle.

Aspects and embodiments may be used for databases used for outputting three-dimensional maps, in particular in vehicle navigation devices.

It is to be understood that the features mentioned above and those to be explained below can be used not only in the respective combinations indicated, but also in other combinations or in isolation.

BRIEF DESCRIPTION OF THE DRAWINGS

The foregoing and other features of embodiments will become more apparent from the following detailed description of embodiments when read in conjunction with the accompanying drawings. In the drawings, like reference numerals refer to like elements.

DETAILED DESCRIPTION

Figure 1:
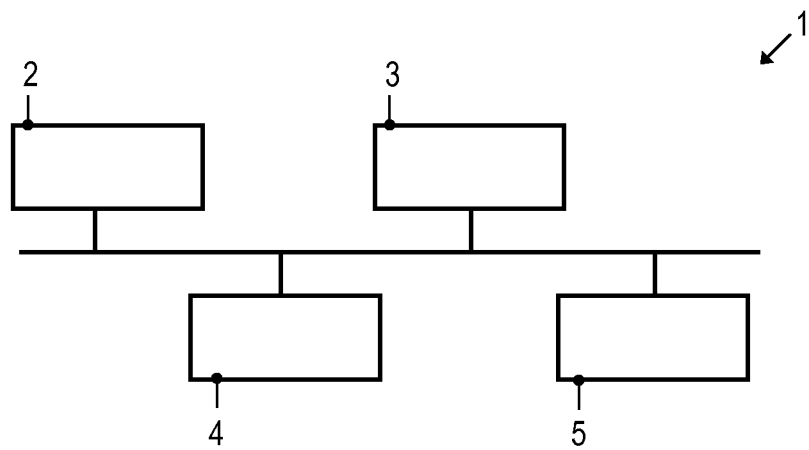
FIG. 1 is a schematic block diagram of a navigation device.

FIG. 1 schematically illustrates a navigation device 1 according to an embodiment. The navigation device 1 comprises a processing device 2 controlling the operation of the navigation device 1. The processing device 2 may comprise a central processing unit, for example including one or more microprocessors, digital signal processors or application-specific integrated circuits. The processing device 2 may also include a graphics processor. The navigation device 1 further includes a database stored in a storage device 3. The storage device 3 may comprise any one, or any combination, of various types of memory, such as random access memory, flash memory or a hard drive, but also removable memories such as a compact disk (CD), a DVD, a memory card or the like. The navigation device 1 also includes an optical output device 4. The navigation device 1 may also include an input interface 5.

The navigation device 1 may include additional components, such as a position sensor and/or a wireless receiver. The position sensor may be adapted to determine the current position of a vehicle in which the navigation device 1 is installed. The position sensor may comprise a GPS (Global Positioning System) sensor, a Galileo sensor, a position sensor based on mobile telecommunication networks or the like. The wireless receiver may be configured to receive information for updating the database stored in the storage device 3.

The storage device 3 stores a database comprising map data in which road vectors representing road segments are stored. As will be explained in more detail in the following, the road vectors are stored as three-dimensional road vectors. I.e., the road vectors are stored in a format which allows three spatial coordinates (x, y, z) of points located on the respective road vector to be determined. The three-dimensional road vector(s) may have any one of various data formats. For illustration, a coordinate 3-tuple representing the (x, y, z)-coordinates of the starting point and another coordinate 3-tuple representing the (x, y, z)-coordinates of the endpoint of the three-dimensional road vector may be stored in the database. Other representations are possible. For illustration, a coordinate 3-tuple representing the (x, y, z)-coordinates of one of the starting point or endpoint in combination with a pair of angles defining the orientation of the 3D road vector and a length of the 3D road vector may be stored in the database. In addition, the database may also include digital terrain model data which may be used for generating a three-dimensional map which includes a perspective view of terrain surrounding road segments.

The processing device 2 is configured to generate a perspective view of road segments based on the three-dimensional road vectors stored in the storage device 3. The generation of the perspective view of the road segments may be directly based on the three-dimensional road vectors stored in the database, without having to compute a projection of the three-dimensional road vectors onto a surface defined by the digital terrain model. The processing device 2 may retrieve the digital terrain model data to generate a perspective view of terrain surrounding road segments.

The three-dimensional road vectors stored in the database of the navigation device 1 may be generated before the database is stored in the navigation device 1. Methods of generating the database will be explained in more detail with reference to FIGS. 3 and 5-16 below.

The database with the three-dimensional road vectors may be deployed to the navigation device in various ways and as various times. For illustration, the database or part of the database may be stored in the navigation device 1 after assembly and before use of the navigation device 1. Alternatively or additionally, the database or part of the database may be stored in the navigation device 1 in an update procedure. Such an update procedure may include wired or wireless transfer of three-dimensional road vectors to the navigation device to accommodate changes in the road network in an update of the navigation device database.

The database stored in the memory 3 may include different logical layers, as will be explained in more detail with reference to FIG. 2. Additionally, the database may be split into different blocks which are associated with different update regions or tiles of a tiling. Such a structure facilitates performing updates. This is particularly desirable for performing updates of the database to adjust the database to local changes, for example to new roads or reconstructed roads. Such updates may then be performed by updating only the update regions or tiles affected by changes in the road network. This allows the updates to be more readily performed in a more time-efficient manner or as over-the-air updates.

Figure 2:
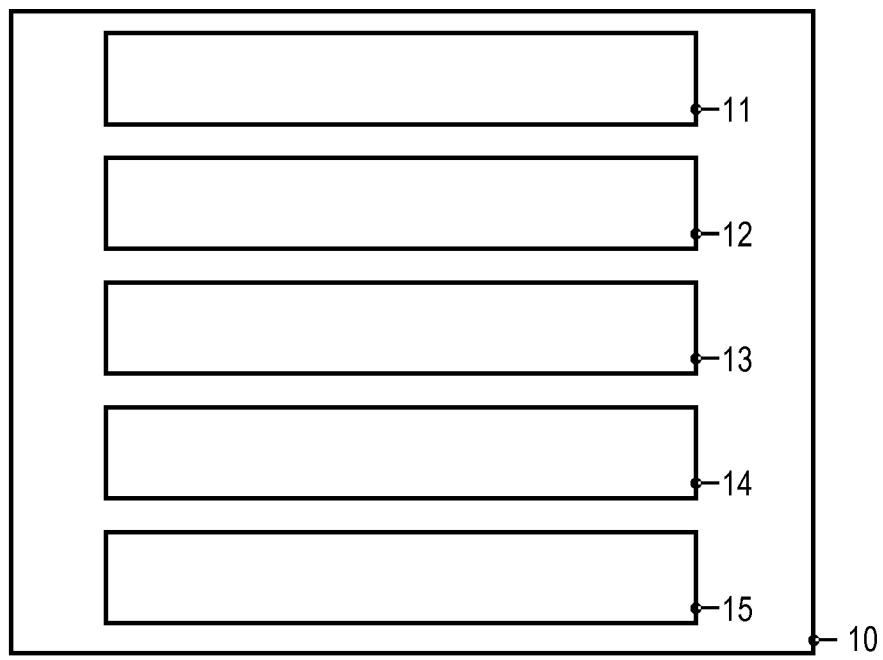
FIG. 2 is a schematic representation of a database.

FIG. 2 is a schematic representation of a map database 10. A map database 10 having the structure explained in the following may be stored in the storage device 3 of the navigation device 1.

The map database 10 includes a plurality of layers 11-15. The layers may include a routing layer 11 which stores the information required for performing route searches and a guidance layer 12 which stores data required for route guidance. The map database 10 may include additional layers 13-15. A name layer 13 may includes references to road names, house numbers or similar. A point of interest (POI) layer 14 may include information on points of interest. An Advanced Driver Assistance System (ADAS) layer 15 may include data for Advanced Driver Assistance. Additional or alternative layers may be provided, such as a truck layer including specific information for trucks or lorries, a layer for phonetic representations, or a layer for basic map display.

The map database 10 may be configured as a relational database. At least one of the layers of the database, such as the routing layer 11 or the guidance layer 12, may include three-dimensional road vectors. The digital map data may be stored in the guidance layer 12, the POI layer 14, or another suitable layer, or in plural such layers.

Figure 3:
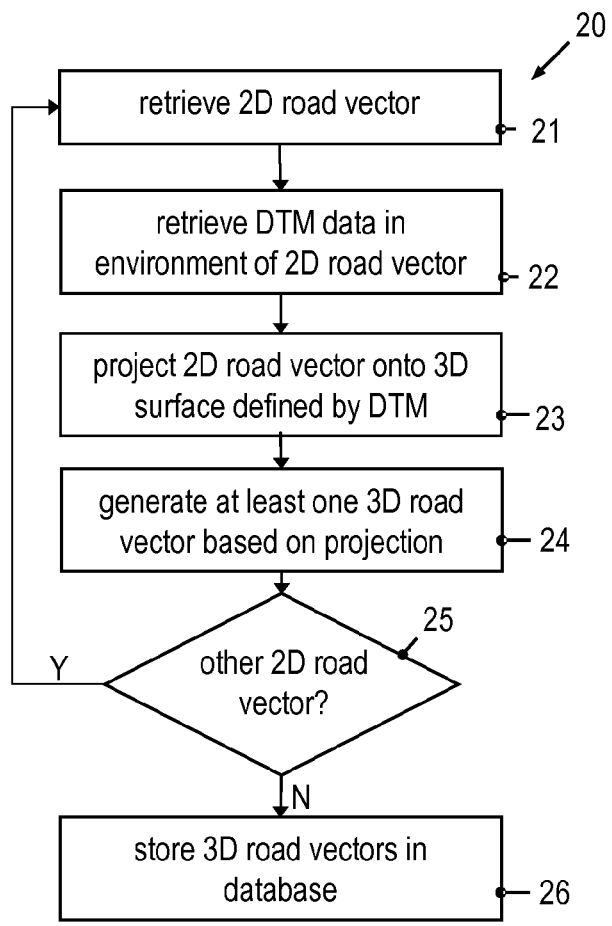
FIG. 3 is a flow chart of a method of generating a database.

FIG. 3 is a flow chart of a method 20 of generating a database which includes three-dimensional road vectors. The method 20 may be performed by an electronic computing device which is separate from the navigation device. The database generated by the electronic computing device with the three-dimensional road vectors included therein may be deployed to plural navigation devices for use in generating three-dimensional optical output. The plural navigation devices may be installed in plural different vehicles. The method 20 may be performed by an electronic computing device which is separate from a vehicle, so that the database which includes the three-dimensional road vectors can be transferred to the vehicle for use in outputting 3D maps.

Generally, conventional map data in which road segments are represented by two-dimensional road vectors representing road segments are processed using digital terrain model (DTM) data to generate three-dimensional road vectors. The three-dimensional road vectors include information on a height-coordinate of the initial points and endpoints and, thus, all intermediate points on the respective road vector. In contrast to the original two-dimensional road vectors which may be defined by 2-tuples (xA, yA) of coordinates of an initial point and (xB, yB) of coordinates of an endpoint, the three-dimensional road vectors include information on the z-coordinate. The z-direction points along the gravity vector, such that the three-dimensional road vectors may be respectively defined in terms of 3-tuples (xA, yA, zA) of coordinates of an initial point and (xB, yB, zB) of coordinates of an endpoint. To this end, the two-dimensional road vectors are projected onto a three-dimensional surface defined by the DTM data. The height values, i.e., the z-coordinates, may then be determined based on the projection.

The direction of the gravity vector, and thus the projection direction used to convert two-dimensional road vectors into three-dimensional road vectors may vary locally. While such changes may be negligible for certain road networks, they can be easily accounted for by allowing the x-, y-, and z-axes to have locally varying directions. Such local changes are negligible for characteristic dimensions of road segments as used in navigation devices and will not be discussed in detail below. However, any reference to x-, y-, and z-axes, or to a projection direction, may take into account local variations of the respective coordinate axes and directions.

At 21, a two-dimensional road vector is retrieved from a conventional map database in which the road vectors are stored as two-dimensional vectors which do not include information on a height difference between the initial point and endpoint of the respective vector. Additional information may be retrieved from the map database, such as information on a road class or on a number of lanes of the road segment represented by the retrieved two-dimensional road vector. The information on the road class or number of lanes may be used to estimate a width of the road segment. The width of the road segment may be used to determine three-dimensional road vectors in a neighbourhood of a node of the road network.

At 22, DTM data are retrieved for at least an environment of the road vector. The DTM data may define an irregular triangulated network (ITN). The DTM data may also have any other suitable format which provides height information as a function of a coordinate 2-tuple which defines a position in a plane orthogonal to the gravity vector. The DTM data define a three-dimensional surface.

At 23, the two-dimensional road vector is projected onto the three-dimensional surface defined by the DTM data. Generally, the resulting projection will be a line which is not straight. For a terrain model in the form of an ITN, the projection may include a sequence of line segments, the orientation of adjacent line segments changing at a boundary between triangular facets of the ITN.

At 24, at least one three-dimensional road vector is determined based on the projection. Determining the at least one three-dimensional road vector may include various processing operations, as will be explained in more detail with reference to FIGS. 5-16.

In some implementations, a number of three-dimensional road vectors which need to be determined to represent the projection may be selected so as to ensure that the distance between points located on the three-dimensional road vectors and the three-dimensional surface is smaller than a threshold value.

In some implementations, three-dimensional road vectors which are oriented perpendicularly to the projection direction may be introduced at nodes where several of the two-dimensional road networks are connected to each other.

In some implementations, the generation of at least one three-dimensional road vector for a given two-dimensional road vector may be performed further in dependence on another two-dimensional road vector which is connected to the two-dimensional road vector retrieved at 21 at a node. Generating at least one three-dimensional road vector at 24 may include determining a width of the road segment represented by the retrieved two-dimensional road vector and a width of another road segment represented by another two-dimensional road vector connected to the two-dimensional road vector retrieved at 21 at a node of the road network.

At 25, it is determined whether another two-dimensional road vector is to be processed so as to generate at least one three-dimensional road vector. If there is another two-dimensional road vector, the method may return to 21. Steps 21-25 may then be repeated with the next two-dimensional road vector.

If steps 21-24 have already been performed for all two-dimensional road vectors for which it is desired to determine at least one three-dimensional road vector, at 26, the three-dimensional road vectors determined for the various two-dimensional road vectors are stored in the database.

If three-dimensional maps are to be output on different levels of detail, i.e. with different degrees of coarseness, the processing described for method 20 may be performed for each one of these levels. Both the map data including the two-dimensional road vectors and the DTM may vary from one level of detail to another level of detail.

While a sequential processing scheme is illustrated in FIG. 3, determining the at least one three-dimensional road vector may also be performed in parallel for several two-dimensional road vectors. The method may also include generating modified DTM data, in order to ensure consistency between the determined three-dimensional road vectors and the surrounding terrain. The modified DTM data may also be stored in the database.

The database generated using the method 20 may subsequently be deployed to a navigation device. Generally, the same database including three-dimensional road vectors will be used in a large number of navigation devices. With height information for road segments being determined in the method 20, it is no longer required to project two-dimensional road vectors onto a three-dimensional surface when a perspective view is to be generated in a navigation device which operates using the database.

Figure 4:
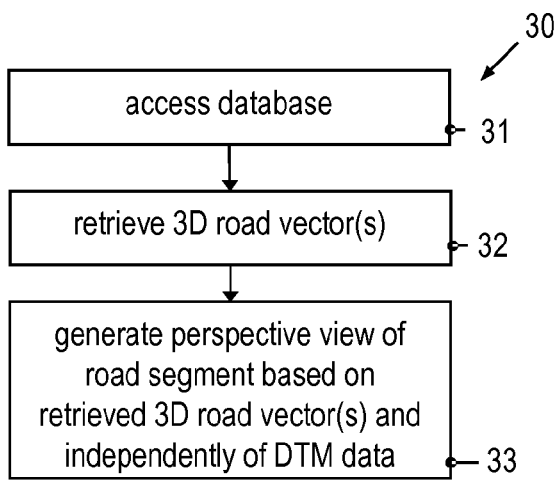
FIG. 4 is a flow chart of a method of outputting a roof structure.

FIG. 4 is a flow chart of a method 30 of outputting a three-dimensional map via an optical output device. The method 30 may be performed by the processing device 2 of the navigation device 1, in order to output a three-dimensional map, i.e. a perspective view, via the optical output device 4. The method 30 uses a database which stores three-dimensional road vectors. The database may also include DTM data. The database may be a non-volatile database storing three-dimensional road vectors. The database may permanently store three-dimensional road vectors for an area which covers a region which is greater than the region displayed on the display. The database may permanently store three-dimensional road vectors for an area which covers, e.g., one or several countries, independently of whether or not the road vector is included in an area which is being displayed on the display. Thus, the pre-computed three-dimensional road vectors may be used when outputting a three-dimensional map on a display, without requiring projections of two-dimensional road vectors onto a surface to be computed onboard the vehicle.

At 31, the database having the three-dimensional road vectors stored therein is accessed. Each one of the three-dimensional road vectors includes height information which specifies the direction of a road segment represented by the three-dimensional road vector in the height direction, i.e., in the direction parallel to the gravity vector.

At 32, one or several three-dimensional road vectors are retrieved from the database. Additional information may be retrieved, such as information on a road class or number of lanes of the respective road segment represented by the three-dimensional road vector(s). Such information may be used to determine the road width.

At 33, a perspective view of a road segment is generated based on the three-dimensional road vector(s). The perspective view of the road segment is generated independently of the DTM data stored in the database. Other data, such as information on a road class or number of lanes may be used when generating the perspective view of the road segment. With the orientation of the road segment in space, and in particular a change in height coordinate along the road segment, being defined by the three-dimensional road vector, it is not required to compute a projection of two-dimensional road vectors onto a three-dimensional surface at 33.

A perspective view of terrain surrounding the road segment may also be generated. This perspective view may be generated based on the DTM data. Since the DTM data defines the surface profile, it is again not required to compute any projections of lines onto the three-dimensional surface defined by the DTM data in order to generate a perspective view of the terrain surrounding the road segment.

Figure 5:
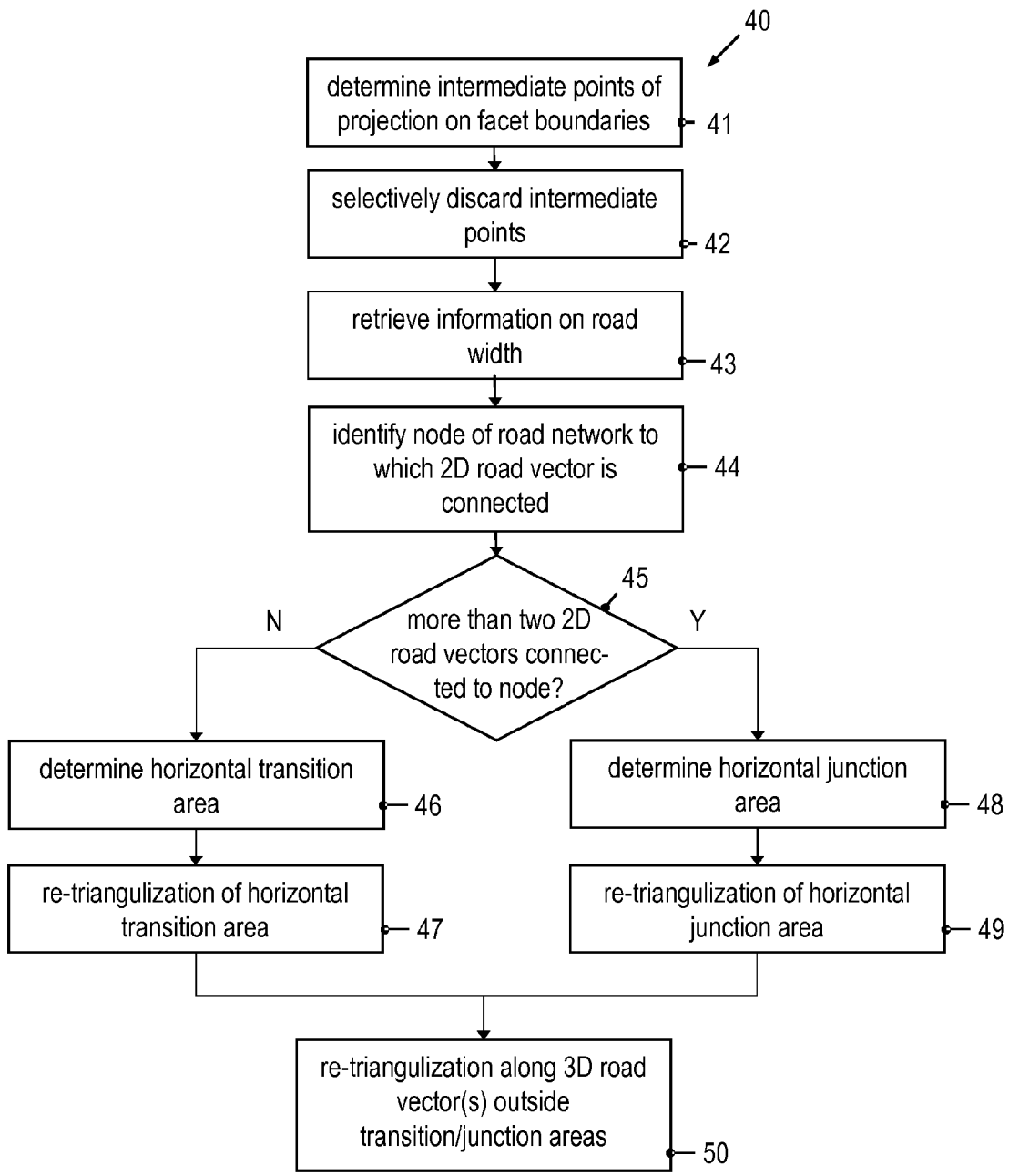
FIG. 5 is a flow chart of a procedure used in a method of generating a database.

With reference to FIGS. 5-16, a procedure for determining three-dimensional road vectors and generating modified DTM data will be explained in more detail. FIG. 5 is a flow chart of the procedure 40. FIGS. 6-16 are illustrative views to which reference will be made for explaining steps of the procedure 40 with reference to exemplary two-dimensional road vectors and DTM data. The procedure 40 may be used to implement step 24 of the method 20 of FIG. 3. The procedure is automatically performed by an electronic computation device, based on a digital map having two-dimensional road vectors and DTM data.

Generally, the procedure described with reference to FIGS. 5-16 for determining the three-dimensional road vectors operates based on several assumptions. Namely, it is assumed that a vector extending perpendicular to a longitudinal axis of a road segment (which corresponds to a three-dimensional road vector) and extending within the plane of the road segment is horizontal and thus perpendicular to the projection direction. It is further assumed that areas at which two or more two-dimensional road vectors are connected to each other are horizontal, i.e. perpendicular to the projection direction. While these are realistic assumptions for most road networks, other constraints may be used in other embodiments.

While certain techniques will be described in the context of generating the three-dimensional road vectors, the same techniques may be used analogously when generating perspective views of road segments from the three-dimensional road vectors.

At 41, after a projection of a two-dimensional road vector onto the three-dimensional surface defined by the DTM data has been established, intermediate points located on the projection are determined. The intermediate points are spaced from the initial point and endpoint of the projection. For DTM data which defines an ITN, the intermediate points may be, or may at least include, points at which the projection traverses a boundary between triangular facets of the ITN.

At 42, intermediate points may be selectively discarded for generating the at least one three-dimensional road vector. The projection on the three-dimensional surface is composed of a series of line segments when the DTM data defines an ITN, such that the projection could be identically represented by a set of three-dimensional road vectors, which is equal in number to the number of different triangular facets of the ITN on which the projection is located. It is possible to reduce the number of three-dimensional road vectors by tolerating a deviation between the three-dimensional road vectors and the three-dimensional surface which is less than or equal to a pre-determined threshold. One three-dimensional road vector may be sufficient to describe line segments extending on different triangular facets of the ITN, provided that the orientation of the triangular facets does not exhibit too significant changes from one facet to another facet. Where the facet plane changes significantly, another three-dimensional road vector needs to be defined.

In order to select the number and orientation of the three-dimensional road vectors in a systematic manner, the distance of the intermediate points determined at 41 from a straight line passing through the initial point of the projection and the endpoint of the projection may be determined. The distance may be compared to a threshold. If the distance is less than or equal to the threshold, it is not required to define a separate vector terminating at the intermediate point.

For illustration, if all intermediate points at which the projection traverses a boundary between facets have a distance from the straight line passing through the initial point of the projection and the endpoint of the projection, with the distance being respectively less than the threshold, it may be generally sufficient to approximate the projection by one vector. As will be explained in more detail below, additional short three-dimensional road vectors with horizontal orientation may be defined at the initial point and endpoint of the thus determined three-dimensional road vector to ensure smooth transitions.

With reference to FIGS. 6-9, steps 41 and 42 will be illustrated in more detail.

Figure 6:
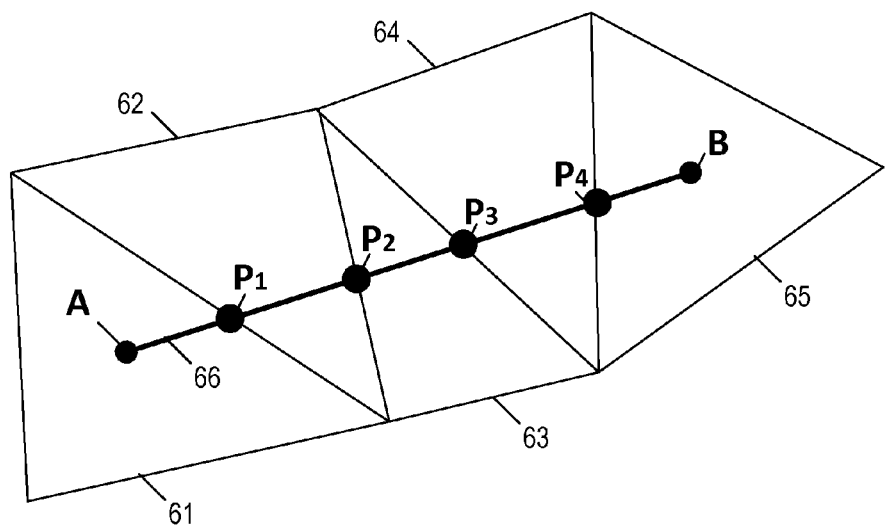
FIG. 6 is a plan view of a road segment represented by a two-dimensional road vector and a terrain model.

FIG. 6 shows a plan view of a two-dimensional road vector 66. A three-dimensional surface in the form of an ITN is also shown in plan view. The ITN includes triangular facets 61-65. The projection of the two-dimensional road vector onto the three-dimensional surface defined by the DTM data has an initial point A and an endpoint B. While shown in a plan view in FIG. 6, all three coordinates of points A and B are known when the two-dimensional road vector is projected onto the three-dimensional surface. Intermediate points $P_1$, $P_2$, $P_3$, and $P_4$ are the points at which the projection traverses a boundary between triangular facets. All three coordinates of each one of the intermediate points may be determined.

For an ITN, it is sufficient to perform the threshold comparison described below for intermediate points located on boundaries between facets. For other formats of DTM data, the intermediate points may be selected according to other criteria. For illustration, intermediate points having a given fixed spacing may be considered.

Figure 7:
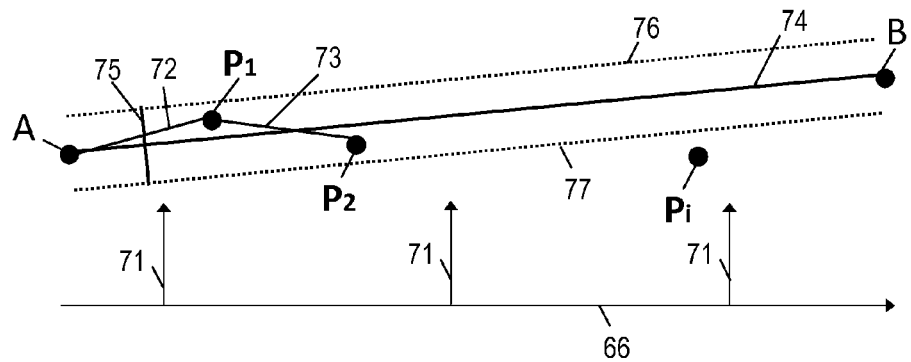
FIG. 7 is a side view in a drawing plane which is spanned by the two-dimensional road vector and the projection direction.

FIG. 7 shows a side view in a drawing plane which is spanned by the two-dimensional road vector 66 and a vector 71 pointing along the projection direction. The plane normal to the vector 71 which points along the projection direction is also referred to as x-y-plane herein, while the direction in which vector 71 points is also referred to as z-direction, which is parallel to the gravity vector.

The projection of the two-dimensional road vector onto the triangular facets of the ITN includes linear segments 72, 73. For intermediate points located on the facet boundaries, there are linear segments extending between the initial point A of the projection and one of the intermediate points $P_1$, between successive intermediate points, and between the last intermediate point and the endpoint B of the projection.

The selecting at step 42 may be implemented such that, for the intermediate points, the distance of the respective intermediate point from the straight line 74 between the initial point A of the projection and the endpoint B of the projection is determined. Thereby, the intermediate points are identified which are not located within a corridor defined by the lines 76 and 77 which extend parallel to the straight line 74. The lines 76 and 77 are offset from the straight line 74 in a direction normal to the straight line 74, by a threshold distance 75. The threshold distance 75 defines the width of the corridor and thus the deviation between the straight line 74 and the three-dimensional surface which is considered acceptable. The threshold distance 75 may be selected based on the level of detail of the map for which the three-dimensional road vectors are respectively determined.

In FIG. 7, an intermediate point $P_i$ is exemplarily shown to be located outside of the corridor. I.e., the distance of $P_i$ from the straight line 74 is greater than the threshold distance 75. All other intermediate points are located within the corridor having a width given by the threshold distance 75. Therefore, with the exception of intermediate point $P_i$ it is not required to define a dedicated three-dimensional road vector terminating at the respective intermediate point.

Figure 8:
FIG. 8 is a side view illustrating plural three-dimensional road vectors generated for a two-dimensional road vector.

FIG. 8 illustrates the resulting set of two three-dimensional road vectors 78 and 79 which results in such a case. One three-dimensional road vector 78 determined for the two-dimensional road vector 66 has the initial point A of the projection as initial point and the intermediate point $P_i$ having a distance of greater than the threshold from the straight line 74 as endpoint. The other three-dimensional road vector 79 determined for the two-dimensional road vector 66 has the intermediate point $P_i$ as initial point and the endpoint B of the projection as endpoint.

Other techniques for determining the number and orientation of three-dimensional road vectors in a systematic manner may be used. For illustration, an intermediate point $P_j$ may be determined such that all intermediate points $P_1, \ldots P_{j-1}$ are located at a distance of less than the threshold from a straight line passing through the initial point A of the projection and $P_j$, but for which the distance of $P_j$ from the straight line passing through the initial point A and the next intermediate point $P_{j+1}$ is greater than the threshold. Then, a first three-dimensional road vector may be defined from the initial point A to the thus identified intermediate point $P_j$. Subsequently, this procedure may be repeated by identifying an intermediate point $P_k$ with k>j such that all intermediate points $P_{j+1}, \ldots, P_{k-1}$ are located at a distance of less than the threshold from a straight line passing through $P_j$ and $P_k$, but for which the distance of $P_k$ from the straight line passing through $P_j$ and the next intermediate point $P_{k+1}$ is greater than the threshold. The next three-dimensional road vector is then defined as vector having $P_k$ as initial point and $P_j$ as endpoint. The procedure may be repeated until the endpoint B of the projection is reached.

Using such a threshold comparison to determine which intermediate points need to be retained to faithfully reproduce the three-dimensional surface, with a tolerance given by the threshold, the number of three-dimensional road vectors may be kept moderate. Storage space requirements may thereby be reduced.

Figure 9:
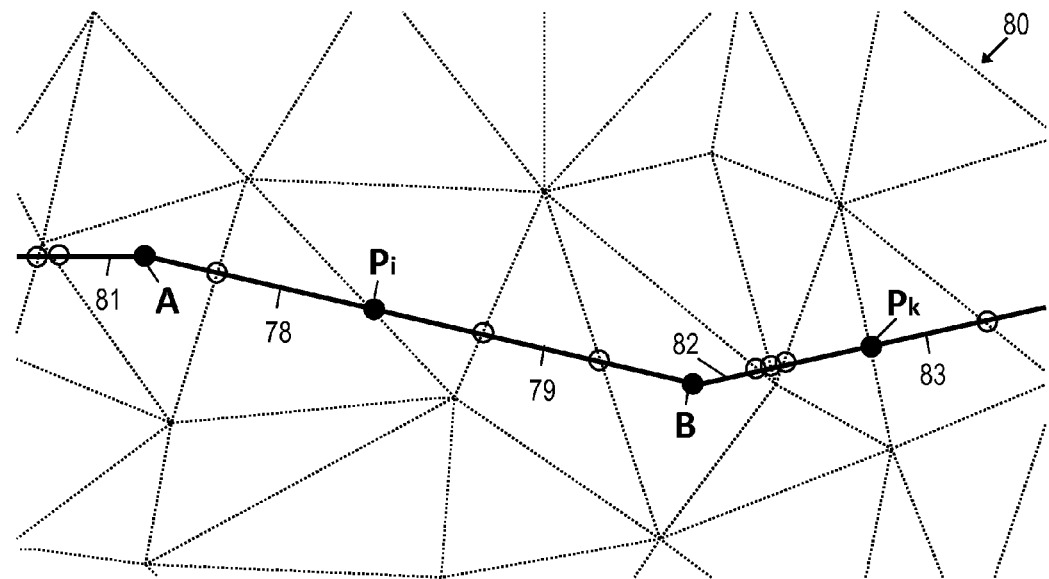
FIGS. 9 and 10 are plan views of road segments represented by two-dimensional road vectors and of a terrain model.

FIG. 9 shows a plan view of a road network with several two-dimensional road vectors. The projection of a two-dimensional road vector terminates at A. The projection of another two-dimensional road vector starts at A and terminates at B. The projection of yet another two-dimensional road vector starts at B. Using the processing described with reference to FIGS. 6-8, intermediate points located on boundaries between facets of the ITN are determined. Intermediate points located by within the corridor explained with reference to FIG. 7 are indicated by open circles and may be disregarded when defining three-dimensional road vectors. Intermediate points located outside the corridor, such as intermediate point $P_i$, are indicated with full circles. Such intermediate points are taken into account when defining three-dimensional road vectors.

In FIG. 9, a three-dimensional road vector terminates at A. Another three-dimensional road vector 78 has A as starting point and $P_i$ as endpoint. Another three-dimensional road vector 79 has $P_i$ as starting point and B as endpoint. Another three-dimensional road vector 82 has B as starting point and $P_k$ as endpoint. Another three-dimensional road vector 83 has $P_k$ as starting point.

The two three-dimensional road vectors 78 and 79 are both determined for the same two-dimensional road vector. Similarly, the two three-dimensional road vectors 82 and 83 are both determined for the same two-dimensional road vector.

Additional three-dimensional road vectors may be defined in proximity to the points A and B which correspond to nodes to which two or more two-dimensional road vectors are connected. These additional three-dimensional road vectors may be defined to have an orientation which is perpendicular to the projection direction 71. I.e., these three-dimensional road vectors may extend horizontally. The height value, i.e. z-coordinate, and length of such horizontal road vectors may be determined based on the two-dimensional road vectors connected to the node, the DTM data and additionally information on a road width for the road segments represented by the two-dimensional road vectors.

Reverting to the procedure 40 of FIG. 5, at 42 information on a road width is retrieved. The information on the road width may be used for defining transition areas or junction areas at nodes of the road network to which at least two two-dimensional road vectors are connected. The information on the road width may be a road class. Various examples for road classifications, such as functional road classes (FRC), are known and used in conventional map data bases. Based on the road class, the road width may be estimated, owing to the fact that roads which are more important for long-distance travel are generally wider than local roads. The information on the road width may also include a number of lanes of the road. Using this information, the road width may also be estimated.

At 44, a node of the road network is identified to which the two-dimensional road vector is connected. If there are plural such nodes, steps 44-49 may be performed for each one of the nodes. If a road segment represented by a two-dimensional vector is not a dead-end road, the road segment will generally be connected to a node at either one of its ends.

In steps 45-49, additional three-dimensional road vectors may be defined to mitigate artefacts at transitions between three-dimensional road vectors which, in plan view, have different orientations when projected into the x-y-plane. Generally, a horizontal closed planar polygon is determined. The height value for the polygon, i.e., the z coordinate value, is determined by computing an intersection point between outer boundaries of two road segments. Three-dimensional road vectors located within the planar polygon are defined, the orientation in the x-y-plane corresponding to that of the associated two-dimensional road vector. At least some edges of the closed polygon may be determined by lines which have the z-value determined for the closed polygon and extend normal to the three-dimensional road vectors.

For reasons of clarity only, the cases in which two two-dimensional road vectors and in which more than two two-dimensional road vectors are connected to a node will be described separately.

At 45, it is determined whether more than two two-dimensional road vectors are connected to the node. If there are only two two-dimensional road vectors connected to the node, the method proceeds to 46. Otherwise, the method proceeds to 48.

At 46, a horizontal transition area is determined in the area of the node. The horizontal transition area has a boundary which is a closed polygon. The horizontal transition area is oriented perpendicularly to the projection direction. The z-coordinate value of the horizontal transition area may be determined by computing the intersection point between outer road boundaries of the two road segments connected to the node.

If an index label "1" is used to refer to the first road segment, the outer boundaries of the first road segment in proximity to the node may be parameterized as $$\vec{p}_1(\lambda_1) = \vec{p}_{A,1} + \lambda_1 \cdot \vec{e}_1 \pm d_1 \cdot \vec{e}_1 \times \vec{e}_p, \quad (2)$$

where $\vec{p}_{A,1}$ is a coordinate three-tuple of the initial point of the three-dimensional road vector corresponding to the first road segment, $\vec{e}_1$ is a unit vector pointing along the three-dimensional road vector for the first road segment, $\vec{e}_p$ is a unit vector pointing along the projection direction, $\lambda_1 \in [0,l_1]$ is a parameter with $l_1$ being the length of the three-dimensional road vector for the first road segment, and $d_1$ is half the road width of the road segment associated with the road vector. For at least one side of the road, the parameterization does not need to be limited to the interval $\lambda_1 \in [0,l_1]$.

Similarly, if an index label "2" is used to refer to the second road segment, the outer boundaries of the second road segment in proximity to the node may be parameterized as $$\vec{p}_2(\lambda_2) = \vec{p}_{A,2} + \lambda_2 \cdot \vec{e}_2 \pm d_2 \cdot \vec{e}_2 \times \vec{e}_p, \quad (3)$$

with the various quantities being in equation (3) being defined correspondingly to the quantities explained with reference to equation (2).

By introducing the horizontal transition area and by accordingly setting an end point of the first and second road segments, it can be ensured that the road boundaries as defined by equations (2) and (3) will intersect. This will be explained in more detail with reference to FIG. 12. The introduction of the horizontal transition area therefore allows artefacts to be reduced which could occur otherwise. Without introducing the horizontal transition area, the road segment boundaries could be skew to each other when output on the display, which may reduce recognition quality for the driver.

The height value, i.e. z-coordinate, of the closed polygon is determined by computing the intersection point of the lines defined by equations (2) and (3). The z-coordinate value for the polygon may be dependent on the widths of the road segments $d_1$ and $d_2$. For each one of the two-dimensional road vectors connected to the node, a three-dimensional road vector is determined which extends at the thus determined z-coordinate value within the closed polygon, with a direction that corresponds to that of the two-dimensional road vector.

At 47, a re-triangularization of the ITN may be performed in an area around the horizontal closed polygon which defines the transition area at a node of the network. The re-triangularization may include defining triangular horizontal facets which, in union, cover the area enclosed by the closed polygon. The re-triangularization may also include defining triangular facets in an area surrounding the transition area. The triangularization may be performed such that at least some of the edges of the closed polygon coincide with edges of triangular facets abutting on the horizontal transition area.

Referring to FIGS. 10-13, steps 46 and 47 will be explained in more detail.

Figure 10:
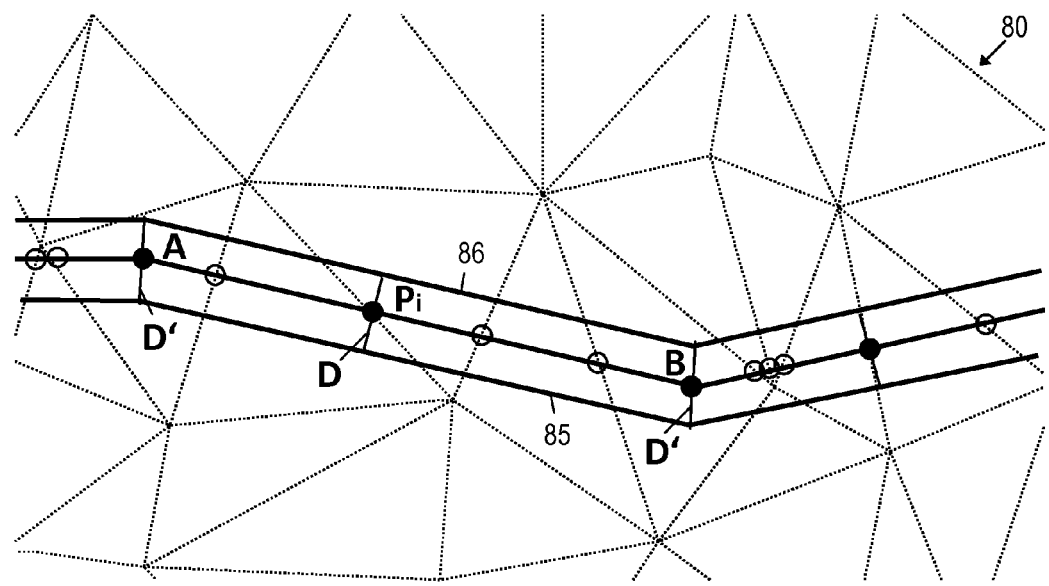

FIG. 10 shows a plan view of an ITN 80. Boundaries of triangular facets are indicated by dotted lines. Information on the width of road segments is retrieved. The width D of the road segments may be determined based on the retrieved information. To this end, information on a road class or on a number of lanes of the road segment may be converted to a road width, using a look-up table or another description associating a road class or a number of lanes with the road width. Using the road width, the outer boundaries of road segments may be determined. Based on the assumption that, in a cross-section taken transverse to the two-dimensional road vector which defines the road segment, the surface of the road segment extends transverse to the three-dimensional road vector and parallel to the x-y-plane, the outer boundaries of road segments may be parameterized in accordance with equations (1)-(3).

In FIG. 10, two three-dimensional road vectors are defined for the projection of a two-dimensional road vector onto the three-dimensional surface. One three-dimensional road vector has A as initial point and $P_i$ as endpoint. The other three-dimensional road vector has $P_j$ as initial point and B as endpoint. The road boundary includes lines extending parallel to the respective three-dimensional road vectors, but offset therefrom in a direction orthogonal to both the projection direction and the direction of the respective three-dimensional road vector. For illustration, road boundaries 85 and 86 extend parallel to the three-dimensional road vector from has $P_i$ to B, but are offset therefrom by $\pm D \cdot \vec{e}_r \times \vec{e}_p$, where D is half the road width, $J_r$ is the normalized vector from $P_i$ to B, and $\vec{e}_p$, is a normalized vector pointing in the projection direction.

At nodes A, B to which two two-dimensional road vectors are connected, a width vector has an orientation along the bisecting line of the angle enclosed by the two two-dimensional road vectors. The length of the width vector is given by $$D' = D/\sin(\alpha/2), \qquad (4)$$

where $\alpha$ is the angle between the two two-dimensional vectors.

Figure 11:
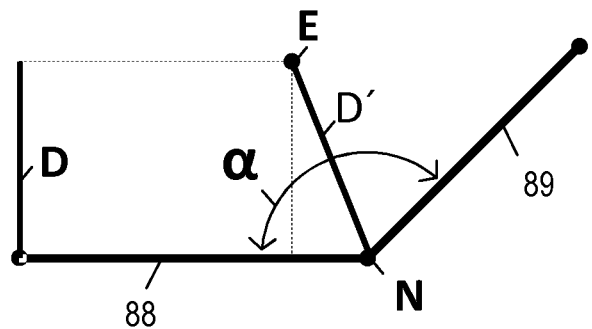
FIG. 11 is a schematic plan view for explaining the introduction of horizontal transition areas.

FIG. 11 shows the construction of the width vector of a road segment at a node N. The two-dimensional road vectors 88 and 89 enclose an angle $\alpha$. Using the definition of D' given in equation (4), a seamless transition between road boundaries is realized.

Figure 12:
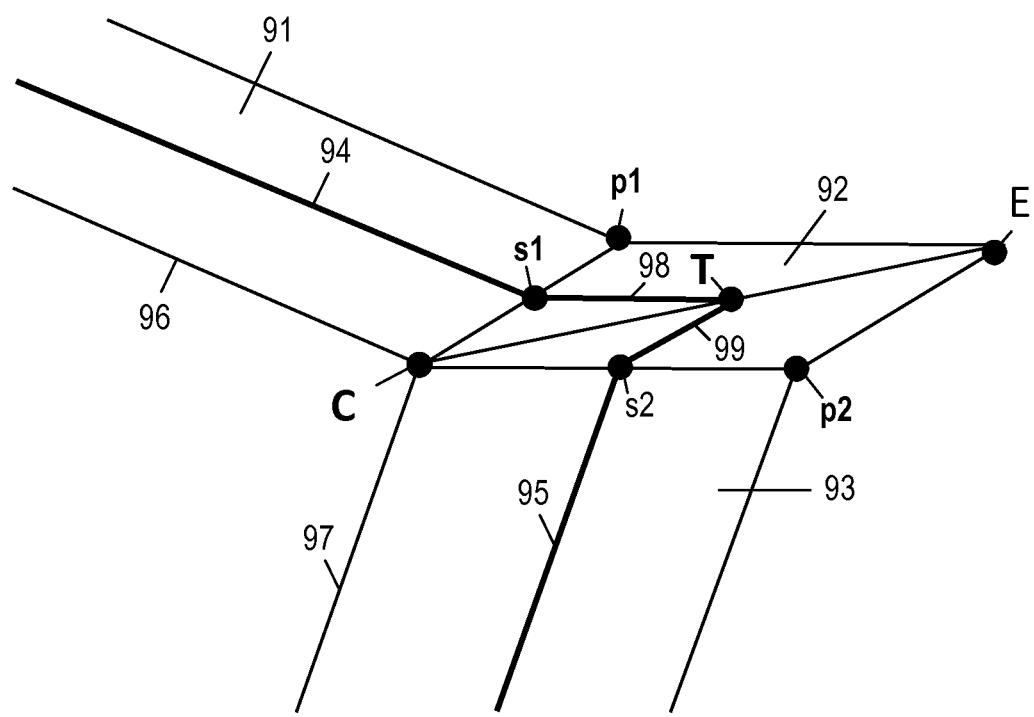
FIG. 12 is a schematic perspective view for explaining the introduction of horizontal transition areas.

FIG. 12 shows a perspective view for explaining the definition of a horizontal transition area 92 and of horizontal three-dimensional road vectors 98, 99 as performed in steps 46 and 47 of the procedure 40.

The transition area 92 is introduced at the transition between a road segment 91 and another road segment 93 which, in the original map data base, are represented by two two-dimensional vectors arranged at an angle different from 0° and 180° relative to each other. A three-dimensional road vector 94 is determined for road segment 91. A three-dimensional road vector 95 is determined for road segment 92.

Road boundaries 96, 97 of the road segments 91, 93 may be parameterized according to equations (2) and (3), with the road half-widths being respectively given by D.

A corner C of the transition area 92, which also determines the z-coordinate value of the transition area, is determined as intersection point of the road boundaries 96 and 97. Based on the determined corner C, all other corners p1, p2 and E of the transition area may also be determined automatically using the following steps.

The corner p1 of the polygon which defines the transition area 92 is determined as endpoint of a vector which has length 2·D, is normal to both the three-dimensional road vector 94 and the projection direction (i.e., which extends parallel to the x-y-plane) and intersects the three-dimensional road vector 94. The corner p2 of the polygon which defines the transition area 92 is determined as endpoint of a vector which has length 2·D, is normal to both the three-dimensional road vector 95 and the projection direction (i.e., which extends parallel to the x-y-plane) and intersects the three-dimensional road vector 95.

The corner E of the polygon may be determined in various ways. For illustration, the coordinates of corner E may be determined by adding the three-dimensional vector from C to p2 to the coordinate vector of p1. Alternatively, the coordinates of corner E may be determined as endpoint of a vector which starts at C, has a direction along the bisecting line of the angle enclosed by the two-dimensional road vectors connected to the node (as shown in FIG. 11) and has a length of 2·D', with D' given by equation (4).

In order to reduce artefacts, two auxiliary three-dimensional road vectors are defined. One three-dimensional road vector is defined for road segment 91 and extends from s1 to T. The coordinates of s1 are obtained as the coordinates of the center of the vector from C to p1. The coordinates of T are the coordinates of the center of the vector from C to E.

Another three-dimensional road vector is defined for road segment 93 and extends from T to s2. The coordinates of s2 are the coordinates of the center of the vector from C to p2.

In order to ensure consistency of the DTM data with the set of three-dimensional road vectors determined for the transition area, modified DTM data are generated. The modified DTM data include triangles abutting on the transition area 92 which have edges coinciding with one of the edges from p1 to E or E to p2 of the transition area 92. Triangular facets may be defined which describe the surface of the road segments which extends parallel to the associated three-dimensional road vector and the transition area oriented perpendicularly to the projection direction.

Figure 13:
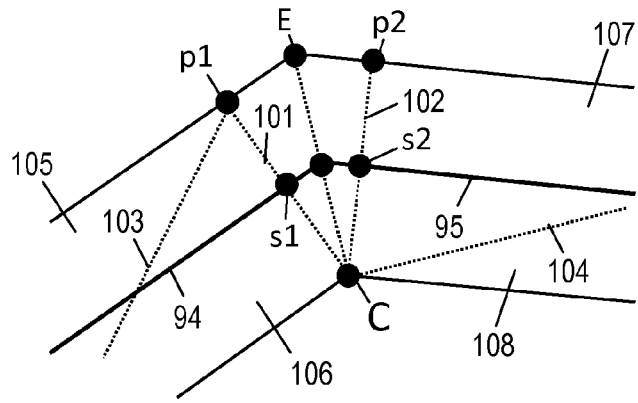
FIG. 13 is a schematic plan view for explaining the introduction of horizontal transition areas.

FIG. 13 illustrates the transition area in plan view to illustrate the re-triangularization. The closed polygon defining the transition area has corners C, p1, E, and p2. Two triangular facets may be defined which are oriented normal to the projection direction and, in union, completely cover the transition area. For illustration, one triangular facet with corners C, p1 and E may be defined, and another triangular facet with corners C, E and p2 may be defined. The corresponding data defining the ITN having such facets may be stored as modified DTM data in the database before the database is deployed to the navigation device. These triangular facets have edges 101 or 102 which extend normal both to one of the three-dimensional road vectors 94 or 95 and to the projection direction.

Additional triangular facets may be defined to describe the surface of the road segments. For illustration, triangular facets 105 and 106 may be defined which have a boundary 103 traversing the three-dimensional road vector 94. The triangular facets 105 and 106 respectively include at least a portion of the three-dimensional road vector 94. One of the triangular facets 106 has an edge 101 which is normal both to the three-dimensional road vector 94 and the projection direction. The other triangular facet 105 extends in the same plane as triangular facet 106.

Similarly, triangular facets 107 and 108 may be defined which have a boundary 104 traversing the three-dimensional road vector 95. The triangular facets 107 and 108 respectively include at least a portion of the three-dimensional road vector 95. One of the triangular facets 107 has an edge 102 which is normal both to the three-dimensional road vector 95 and the projection direction. The other triangular facet 108 extends in the same plane as triangular facet 107.

Reverting to the procedure of FIG. 5, similar techniques as the ones described for a transition between two two-dimensional road vectors may be used for junctions, i.e., for nodes to which more than two two-dimensional road vectors are connected. For such a node, it is determined at 45 that more than two two-dimensional road vectors are connected to the respective vertex. The procedure then proceeds to 48.

At 48, a horizontal junction area is determined. Determining the horizontal junction area includes determining an intersection point between road boundaries of neighbouring road segments at the node. The height-value, i.e. z-coordinate, of the intersection point determines the z-coordinate of the junction area. The horizontal junction area is enclosed by a closed polygon. The intersection point is one of the corners of the closed polygon.

An additional three-dimensional road vector may be defined for each two-dimensional road vector connected to the junction. The three-dimensional road vector may be defined such that it extends in the horizontal junction area and in a direction parallel to that of the two-dimensional road vector to which it is assigned.

At 49, a re-triangularization of the ITN may be performed in an area around the horizontal closed polygon which defines the junction area at the node of the network. The re-triangularization may include defining triangular horizontal facets which, in union, completely cover the junction area enclosed by the closed polygon. The re-triangularization may also include defining triangular facets in an area surrounding the junction area. The triangularization may be performed such that at least some of the edges of the closed polygon coincide with edges of triangular facets abutting on the horizontal junction area.

Figure 14:
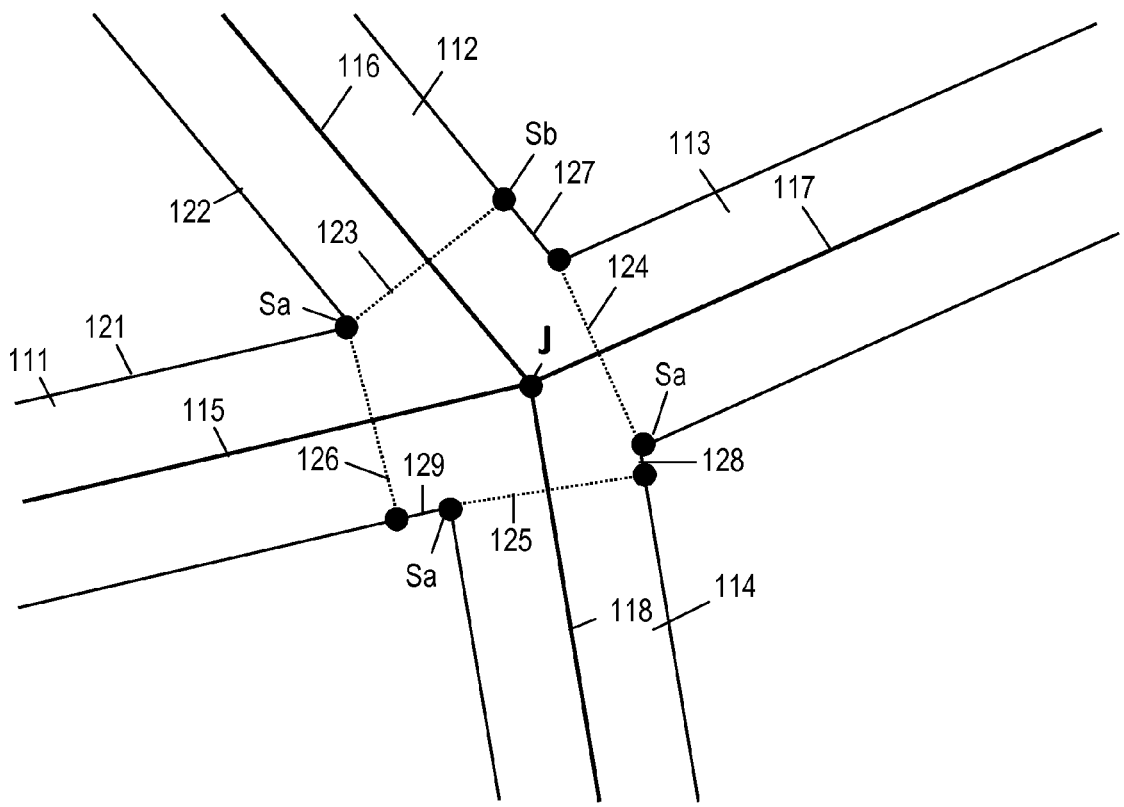
FIGS. 14-16 are schematic plan views for explaining the introduction of horizontal junction areas.
Figure 15:
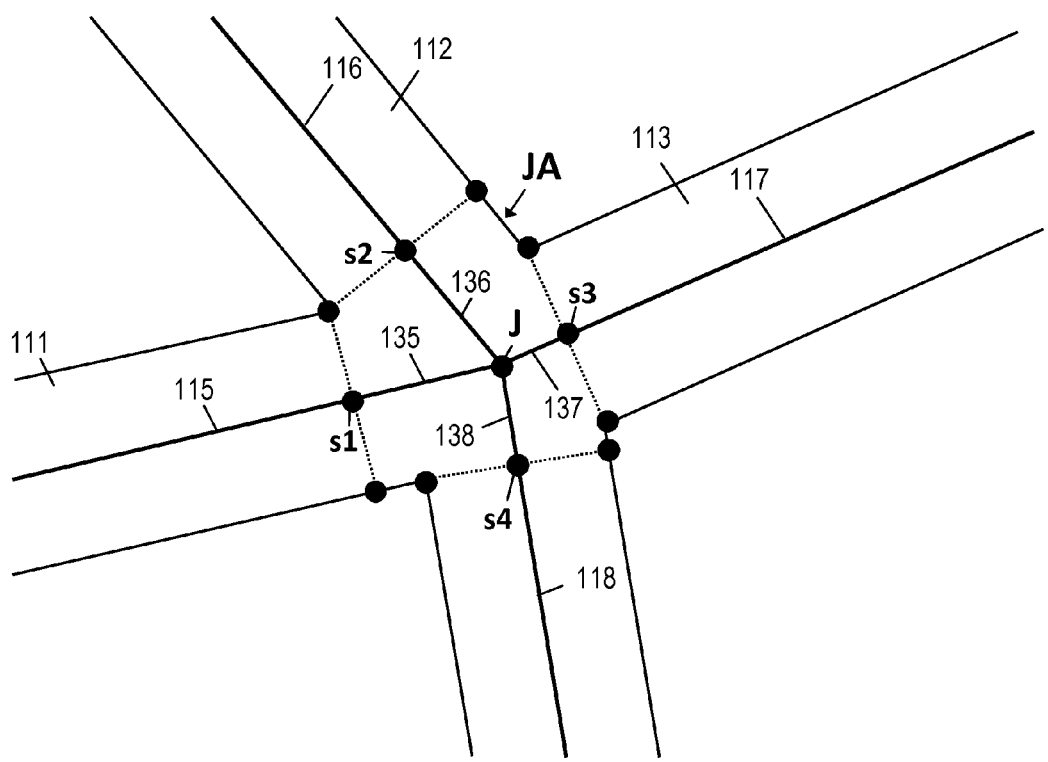
Figure 16:
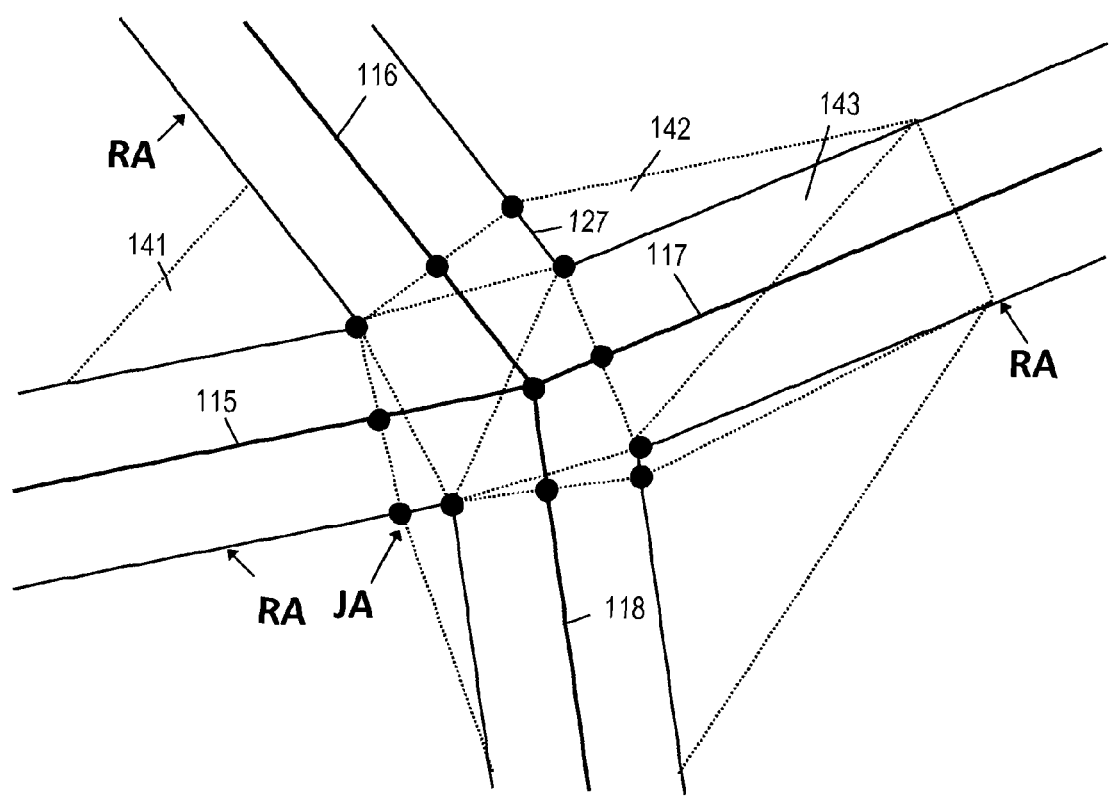

Referring to FIGS. 14-16, steps 48 and 49 will be explained in more detail.

FIG. 14 shows a plan view of a node to which, in the original map data, four two-dimensional road vectors are connected. The two-dimensional road vectors represent road segments 111-114. By projecting the two-dimensional road vectors onto the three-dimensional surface defined by the DTM data and performing the processing described with reference to FIG. 3, three-dimensional road vectors 115-118 are determined. Based on the road widths of the road segments, boundaries of the road segments may be computed which may be parameterized in accordance with equation (1).

Intersection points between the outer road boundaries are determined. This may be done by computing the intersection point using of two lines parameterized by equation (1). These intersection points are indicated by Sa in FIG. 14.

For each one of the thus determined intersection points, a line is determined which intersects a three-dimensional road vector of an adjacent road segment and is normal to both the three-dimensional road vector determined for this road segment and the projection direction. The intersection points of the thus determined lines with the opposite outer road boundaries define additional corners of the polygon. For illustration, the line 123 extends from the intersection point Sa between road segments 111 and 112 such that it is normal to the three-dimensional road vector 116 and the projection direction. The line 123 intersects the opposing outer road boundary of the road segment 112 at a point Sb. Similar points (without reference numerals) obtained by intersecting lines which are perpendicular to the projection direction and perpendicular to one of the three-dimensional road vectors with the opposing outer road boundary are also shown in FIG. 14.

The junction area enclosed by the polygon having edges 123, 127, 124, 128, 125, 129 and 126 extends normal to the projection direction. The z-coordinate of the junction area is determined by one of the intersection points, e.g., by the z-coordinate of the intersection point Sa between outer road boundaries of the road segments 111 and 112.

For each one of the two-dimensional road vectors connected to the junction node, a three-dimensional road vector may be determined which extends within the junction area JA, i.e., in a direction normal to the projection direction. The three-dimensional road vector may respectively be selected such that, within the plane of the junction area JA, it is parallel to the two-dimensional road vector for which it is determined.

FIG. 15 illustrates the determining of these three-dimensional road vectors. For the three-dimensional road vectors 115-118, the points s1-s4 at which the three-dimensional road vector 115-118 respectively intersect one of the edges of the closed polygon defining the junction area JA is determined. For each one of the three-dimensional road vectors 115-118, a straight line 135-138 which extends within the horizontal junction area JA is determined. The straight lines 135-138 respectively extend in a direction perpendicularly to the projection direction and parallel to one of the two-dimensional road vectors connected to the junction node. The intersection point J of the straight lines 135-138 is determined.

For the two-dimensional road vector representing road segment 111, a three-dimensional road vector having initial point s1 and endpoint J is determined. Similarly, corresponding three-dimensional road vectors may be determined for each one of the two-dimensional road vectors connected to the junction node. The three-dimensional road vectors 115-118 which are not required to extend horizontally are re-defined such that they terminate at the point s1-s4 where the respective three-dimensional road vector 115-118 intersects the horizontal junction area JA. The thus determined three-dimensional road vectors 115-118 and 135-138 are stored in the database.

FIG. 16 illustrates the re-triangularization in a neighbourhood of the junction area. The closed polygon defining the junction area JA may be split up into plural triangular facets, each being oriented so as to be perpendicular to the projection direction. The corresponding data defining the ITN having such triangular facets may be stored as modified DTM data in the database before the database is deployed to the navigation device. At least some of the triangular facets which define the junction area JA have an edge which extends normal to both the projection direction and the three-dimensional road vector determined for one of the two-dimensional road vectors connected to the junction node.

Additional triangular facets may be defined for road areas RA. Such triangular facets may cover a road area RA extending along a three-dimensional road vector and having a width, in the direction transverse to the three-dimensional road vector, which is determined by the width information for the respective road segment. For illustration, a triangular facet 143 may be defined which includes at least a portion of the three-dimensional road vector 117. The triangular facet 117 has an edge which is normal both to the three-dimensional road vector 117 and the projection direction. Similar triangular facets may be defined for the other road segments, in the same way as described with reference to FIGS. 12 and 13.

In order to ensure consistency between the three-dimensional road vectors, some of which extend in the horizontal junction area, the triangular facets of the ITN in the neighbourhood of the junction area may also be re-defined. For illustration, a triangular facet 142 may be defined. The triangular facet 142 has an edge 127 which is one of the edges of the planar polygon enclosing the junction area. The triangular facet 142 has another edge which corresponds to an outer boundary of a road segment and is parallel to the three-dimensional road vector 117.

Reverting to the procedure of FIG. 5, after steps 46 and 47 or steps 48 and 49 have been performed for the various nodes, the procedure continues at 50.

At 50, a re-triangularization of the DTM may be performed along the three-dimensional road vectors for areas which have not previously been re-triangularized at 47 or 49, respectively. This re-triangularization may be performed similarly as described with reference to FIG. 12, FIG. 13 and FIG. 16. Triangular facets defining the road surface may be defined. Such triangular facets extend in a rectangular planar surface which includes the respective three-dimensional road vector and which has an edge that is perpendicular to both the projection direction and the respective three-dimensional road vector. The width of the rectangular planar surface, measured in a direction normal to the three-dimensional road vector, may be determined based on information on the road width for the respective road segment. The rectangular planar surface may be partitioned into two or more triangular facets.

In an area adjacent to the road surface, the ITN may also be re-defined so as to ensure consistency with the three-dimensional road vectors. Triangular facets may be defined which abut on the triangular facets defined for the road surface. Such triangular facets which define the terrain surrounding the road segment may have an edge which extends along an outer boundary of the road segment, which may be parameterized according to equation (1).

Data representing the thus re-triangularized ITN may also be stored in the database. When the database is subsequently deployed to a navigation device, a perspective view of the terrain which abuts on the road segment is generated in a manner which is consistent with the perspective view of the road segment(s) generated based on the three-dimensional road vectors.

While methods and a device according to embodiments have been described in detail, modifications may be implemented in other embodiments. For illustration, while the generation of transition areas and junction areas has been illustrated with reference to exemplary scenarios in which all road segments have the same width, different road widths of road segments connected to a junction may be readily accounted for.

For further illustration, determining three-dimensional road vectors according to any one of the methods described herein may be performed repeatedly for different levels of details (and thus for different scales) at which the three-dimensional map is to be output. In this case, certain parameters such as a threshold used to discard intermediate points of a projection on the three-dimensional surface as explained with reference to FIGS. 6-9 may be set to different values for the different levels of detail. The various sets of three-dimensional road vectors determined may be stored in the database. For a database having a layer structure corresponding to different levels of details, the various sets of three-dimensional road vectors may respectively stored in the layer which corresponds to the respective level of detail for which the three-dimensional road vectors were determined.

Embodiments of the invention may be used for generating databases for use in navigation devices and for outputting three-dimensional maps via an optical output device of a navigation device.

The invention claimed is:

1. A method of generating a database for a navigation device for use in generating perspective views, the method comprising:
retrieving a plurality of two-dimensional road vectors from a map database in a non-volatile storage medium, each one of said two-dimensional road vectors defining a road segment of a road network;
retrieving digital terrain model data defining a three-dimensional surface;
for each two-dimensional road vector of said retrieved plurality of two-dimensional road vectors:
establishing a projection of said two-dimensional road vector onto said three-dimensional surface along a pre-defined projection direction;
determining at least one three-dimensional road vector based on said established projection, said at least one three-dimensional road vector including height information for points located on the at least one three-dimensional road vector;
storing said at least one three-dimensional road vector in said database before the database is deployed to the navigation device; and
modifying the digital terrain model data based on said determined at least one three-dimensional road vector to generate modified digital terrain model data that ensure a seamless transition between road segment boundaries and surrounding terrain in a three-dimensional map output by the navigation device, wherein generating said modified digital terrain model data includes:
determining, for a plurality of said determined three-dimensional road vectors, a triangular facet in which the respective three-dimensional road vector extends and which has an edge normal to both the three-dimensional road vector and said projection direction.

2. The method of claim 1, wherein said determining said at least one three-dimensional road vector includes:
determining, for plural intermediate points located on said projection respectively a distance of the intermediate point from a straight line passing through an initial point of said projection and another point of said projection, said initial point and said other point of said projection respectively having a coordinate 3-tuple located on said three-dimensional surface.

3. The method of claim 2, wherein a threshold comparison is respectively performed for said distance, and said at least one three-dimensional road vector is determined based on said threshold comparison.

4. The method of claim 3, wherein more than one three-dimensional road vector is selectively determined for a two-dimensional road vector if, for an intermediate point, said distance is greater than said threshold.

5. The method of claim 2, wherein said three-dimensional surface defined by said digital terrain model data includes a plurality of facets, and wherein said plural intermediate points include points of said projection located on boundaries between facets.

6. The method of claim 2, wherein said modified digital terrain model data are stored in said database before said database is deployed to said navigation device.

7. The method of claim 6, wherein information on a road width is respectively retrieved for said plurality of two-dimensional road vectors, and wherein said at least one three-dimensional road vector and said modified digital terrain model data are determined based on said information on a road width.

8. The method of claim 6, wherein generating said modified digital terrain model data includes:
identifying nodes of said road network to which respectively at least a first two-dimensional road vector and a second two-dimensional road vector of the plurality of two-dimensional road vectors are connected, and,
for each one of said identified nodes, identifying a planar polygon oriented normal to said projection direction such that a first three-dimensional road vector determined for said first two-dimensional road vector and a second three-dimensional road vector determined for said second two-dimensional road vector are arranged within said polygon.

9. The method of claim 8, wherein a corner of said polygon is determined by computing three spatial coordinates of an intersection point of a first road boundary determined based on said first two-dimensional road vector and of a second road boundary determined based on said second two-dimensional road vector.

10. The method of claim 8, wherein a subset of edges of said polygon respectively are oriented such that each edge of the subset is normal to said projection direction and respectively one of the three-dimensional road vectors located within the area defined by the polygon or intersecting the polygon.

11. The method of claim 8, wherein said nodes for which said planar polygon normal to said projection direction is determined include road junctions to which more than two two-dimensional road vectors are connected.

12. The method of claim 1, wherein said database is a relational database.

13. The method of claim 1, wherein said database is generated by an electronic device separate from the navigation device and is deployed to plural navigation devices installed in plural different vehicles.

14. A non-transitory computer-readable medium storing program instructions that, when executed by a processing unit, cause the processing unit to generate a database for a navigation device for use in generating perspective views by performing the steps of:
   retrieving a plurality of two-dimensional road vectors from a map database in a non-volatile storage medium, each one of said two-dimensional road vectors defining a road segment of a road network;
   retrieving digital terrain model data defining a three-dimensional surface;
   for each two-dimensional road vector of said retrieved plurality of two-dimensional road vectors:
      establishing a projection of said two-dimensional road vector onto said three-dimensional surface along a pre-defined projection direction;
      determining at least one three-dimensional road vector based on said established projection, said at least one three-dimensional road vector including height information for points located on the at least one three-dimensional road vector;
      storing said at least one three-dimensional road vector in said database before the database is deployed to the navigation device; and
      modifying the digital terrain model data based on said determined at least one three-dimensional road vector to generate modified digital terrain model data that ensure a seamless transition between road segment boundaries and surrounding terrain in a three-dimensional map output by the navigation device, wherein generating said modified digital terrain model data includes:
         determining, for a plurality of said determined three-dimensional road vectors, a triangular facet in which the respective three-dimensional road vector extends and which has an edge normal to both the three-dimensional road vector and said projection direction.

15. A navigation device, comprising:
an optical output device;
a map database stored in a non-volatile storage medium; and
a processing device coupled to said optical output device and to said map database, said processing device being configured to:
retrieve a plurality of two-dimensional road vectors from the map database, each one of said two-dimensional road vectors defining a road segment of a road network;
retrieve digital terrain model data defining a three-dimensional surface;
for each two-dimensional road vector of said retrieved plurality of two-dimensional road vectors:
   establish a projection of said two-dimensional road vector onto said three-dimensional surface along a pre-defined projection direction;
   determine at least one three-dimensional road vector based on said established projection, said at least one three-dimensional road vector including height information for points located on the at least one three-dimensional road vector;
   store said at least one three-dimensional road vector in said database before the database is deployed to the navigation device; and
   modify the digital terrain model data based on said determined at least one three-dimensional road vector to generate modified digital terrain model data that ensure a seamless transition between road segment boundaries and surrounding terrain in a three-dimensional map output by the navigation device, wherein generating said modified digital terrain model data includes:
      determining, for a plurality of said determined three-dimensional road vectors, a triangular facet in which the respective three-dimensional road vector extends and which has an edge normal to both the three-dimensional road vector and said projection direction.

* * * * *